US011845882B2

(12) United States Patent
Komuro

(10) Patent No.: US 11,845,882 B2
(45) Date of Patent: Dec. 19, 2023

(54) MULTILAYER STRUCTURE, RESIN COMPOSITION FOR ADHESIVE RESIN LAYER, AND MULTILAYER STRUCTURE PRODUCTION METHOD

(71) Applicant: THE NIPPON SYNTHETIC CHEMICAL INDUSTRY CO., LTD., Osaka (JP)

(72) Inventor: Ryohei Komuro, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 16/249,385

(22) Filed: Jan. 16, 2019

(65) Prior Publication Data

US 2019/0194504 A1 Jun. 27, 2019

Related U.S. Application Data

(63) Continuation of application No. PCT/JP2017/026328, filed on Jul. 20, 2017.

(30) Foreign Application Priority Data

Jul. 27, 2016 (JP) ................................. 2016-147602

(51) Int. Cl.
| | |
|---|---|
| C09J 123/26 | (2006.01) |
| B32B 27/32 | (2006.01) |
| C08L 23/26 | (2006.01) |
| C08K 5/09 | (2006.01) |
| B32B 27/28 | (2006.01) |
| B32B 27/18 | (2006.01) |
| B32B 27/30 | (2006.01) |
| B29B 9/12 | (2006.01) |
| B32B 7/12 | (2006.01) |
| B32B 27/08 | (2006.01) |
| B32B 27/34 | (2006.01) |
| C08K 5/098 | (2006.01) |
| C09J 11/06 | (2006.01) |
| B29B 9/06 | (2006.01) |

(52) U.S. Cl.
CPC .............. *C09J 123/26* (2013.01); *B29B 9/12* (2013.01); *B32B 7/12* (2013.01); *B32B 27/08* (2013.01); *B32B 27/18* (2013.01); *B32B 27/28* (2013.01); *B32B 27/30* (2013.01); *B32B 27/306* (2013.01); *B32B 27/32* (2013.01); *B32B 27/34* (2013.01); *C08K 5/09* (2013.01); *C08K 5/098* (2013.01); *C08L 23/26* (2013.01); *C09J 11/06* (2013.01); *B29B 9/06* (2013.01); *B29B 9/065* (2013.01); *B32B 2250/05* (2013.01); *B32B 2250/24* (2013.01); *B32B 2250/40* (2013.01); *B32B 2307/7242* (2013.01); *B32B 2439/00* (2013.01); *B32B 2439/70* (2013.01)

(58) Field of Classification Search
CPC ... B32B 7/12; B32B 2307/7244; B32B 27/32; C08K 5/09; C08K 5/098; C09J 123/26; C09J 123/30
See application file for complete search history.

(56) References Cited

U.S. PATENT DOCUMENTS

| | | | |
|---|---|---|---|
| 2003/0175538 A1* | 9/2003 | Yamaguchi | C08F 255/00 428/515 |
| 2007/0036960 A1 | 2/2007 | Lambert et al. | |
| 2012/0009431 A1* | 1/2012 | Kazeto | C08L 23/0861 524/301 |
| 2016/0217883 A1 | 7/2016 | Luo et al. | |
| 2016/0221313 A1* | 8/2016 | Kawai | B32B 27/306 |
| 2017/0183426 A1* | 6/2017 | Kawai | B32B 27/302 |
| 2019/0023954 A1 | 1/2019 | Kouka et al. | |

FOREIGN PATENT DOCUMENTS

| | | | |
|---|---|---|---|
| JP | 54-87783 | | 7/1979 |
| JP | H04-119170 A | | 4/1992 |
| JP | 4-246446 | | 9/1992 |
| JP | H07-282641 A | | 10/1995 |
| JP | 2003-073506 | | 3/2003 |
| JP | 2005-112940 | | 4/2005 |
| JP | 2009-504842 A | | 2/2009 |
| JP | 2012-172047 | | 9/2012 |
| JP | 2012172047 A | * | 9/2012 |
| JP | 2014-189667 | | 10/2014 |
| JP | 2016-533623 | | 10/2016 |
| WO | WO-2015050211 A1 | * | 4/2015 ............. B32B 27/08 |
| WO | 2017/134931 A1 | | 8/2017 |

OTHER PUBLICATIONS

JP 2012-172047A English translation (Year: 2012).*
Supplemental European Search Report issued in counterpart European Patent Application No. 17834157.4 dated Jul. 9, 2019.
International Search Report issued in International Patent Application No. PCT/JP2017/026328, dated Oct. 10, 2017, along with an English translation thereof.
International Preliminary Report on Patentability issued in International Patent Application No. PCT/JP2017/026328, dated Jan. 29, 2019, along with an English translation thereof.
European OA issued in European Patent Application No. 17834157. 4, Sep. 23, 2020.

(Continued)

*Primary Examiner* — Jasper Saberi

(74) *Attorney, Agent, or Firm* — GREENBLUM & BERNSTEIN, P.L.C.

(57) ABSTRACT

A multilayer structure includes an adhesive resin layer provided between a thermoplastic resin layer and a gas barrier resin layer, wherein the adhesive resin layer is formed from a resin composition containing a polyolefin resin (A) containing at least one of a carboxyl group and an acid anhydride group, and a fatty acid zinc salt (B), wherein the fatty acid zinc salt (B) is present in the resin composition in a proportion of 40 to 250 ppm on a metal basis based on the amount of the adhesive resin layer.

12 Claims, No Drawings

(56) References Cited

OTHER PUBLICATIONS

Japanese OA issued in JP Patent Application No. 2017-538754, Oct. 6, 2020, English translation.
Office Action issued in Japanese Patent Application No. 2017-538754, dated Jun. 29, 2021, English translation.
Office Action issued in Japanese Patent Application No. 2017-538754, dated Feb. 8, 2022, translation.
Office Action issued in European Patent Application No. 17834157.4 dated Mar. 13, 2023.

* cited by examiner

MULTILAYER STRUCTURE, RESIN COMPOSITION FOR ADHESIVE RESIN LAYER, AND MULTILAYER STRUCTURE PRODUCTION METHOD

RELATED APPLICATION

This application is a continuation of International Application No. PCT/JP2017/026328, filed on Jul. 20, 2017, which claims priority to Japanese Patent Application No. 2016-147602, filed on Jul. 27, 2016, the entire contents of each of which are hereby incorporated by reference.

TECHNICAL FIELD

The present disclosure relates to a multilayer structure that includes a thermoplastic resin layer, a gas barrier resin layer, and an adhesive resin layer provided between the thermoplastic resin layer and the gas barrier resin layer. More specifically, the present disclosure relates to a multilayer structure that has a higher level of transparency and ensures adhesion between a gas barrier resin layer and an adhesive resin layer. The present disclosure further relates to a resin composition for the adhesive resin layer, and a method of producing the multilayer structure.

BACKGROUND ART

Thermoplastic resins such as polyolefins and polystyrenes that can be easily formed into desired shapes to provide various package forms are generally used as packaging materials for packaging food and other various articles. In order to maintain the freshness and the quality of the food for a longer period of time, the packaging materials often include a gas barrier layer for prevention of permeation of oxygen and the like.

Examples of the gas barrier layer to be generally provided in the conventional packaging materials include a gas barrier layer of an inorganic substance and a gas barrier layer of an organic substance. Usable examples of the gas barrier layer of the inorganic substance include metal layers such as aluminum foils and aluminum deposition layers, and metal compound layers such as silicon oxide deposition layers and aluminum oxide deposition layers. The metal layers such as the aluminum foils and the aluminum deposition layers disadvantageously make the packaged articles invisible, and are poorer in disposability. The metal compound layers such as the silicon oxide deposition layers and the aluminum oxide deposition layers are liable to be deformed when being subjected to a secondary process such as a printing process or a laminating process, or are liable to crack due to vibrations and shocks applied to the packages during transportation or when the packaging materials are deformed or dropped. This disadvantageously results in remarkable deterioration in gas barrier property.

Usable examples of the gas barrier layer of the organic substance include layers of polyamide resins, and layers of vinyl alcohol resins such as polyvinyl alcohols and saponified ethylene-vinyl ester copolymers (hereinafter sometimes referred to as "EVOH"). Advantageously, the layers of the polyamide resins and the vinyl alcohol resins such as the polyvinyl alcohols and the EVOH are transparent, and less liable to cause the cracking of the gas barrier layer and the problem of disposability. Therefore, these layers are widely used for the packaging materials.

The EVOH is rich in hydroxyl groups, and the polyamide resin is rich in amide bonds. Therefore, these resins are capable of preventing the permeation of oxygen in the presence of hydrogen bonds and, hence, excellent in gas barrier property. When water intrudes into these resins, however, hydrogen bonds of the resins are weakened, thereby deteriorating the gas barrier property. Therefore, the gas barrier resin layers such as of the EVOH and the polyamide reins are generally held between layers of a thermoplastic resin such as a polyolefin resin or a polystyrene resin for production of multilayer structures for use in various packaging applications. In this case, however, it is necessary to provide an adhesive resin layer between the layer of the gas barrier resin such as the EVOH or the polyamide resin (which is rich in hydrogen bonds) and the layer of the polyolefin resin (which is highly hydrophobic) because of poorer adhesion between these resins.

Known arts for improving the adhesion are such that a higher fatty acid metal salt such as calcium stearate is blended with a polyolefin modified with an unsaturated carboxylic acid monomer and the resulting composition is used for the adhesive resin layer (see, for example, PTL 1 and PTL 2). In the art of PTL 1, however, it is stated that, where the proportion of the higher fatty acid metal salt to be added to the adhesive resin layer is greater than 0.15 parts by weight based on 100 parts by weight of the resin, the adhesive force is remarkably reduced, and a resin composition containing calcium stearate in a proportion of 0.05 parts by weight at the maximum based on 100 parts by weight of the total of a polypropylene and a maleic anhydride-modified polypropylene is shown in Example (see Line 3 of a left lower column of Page 4, and Example in PTL 1). The amount of calcium stearate in the resin composition is 33 ppm on a metal basis.

In the art of PTL 2, it is stated that, where the proportion of the fatty acid metal salt is less than 100 ppm based on the amount of the adhesive resin composition, an unsaturated carboxylic acid such as succinic acid and an unsaturated carboxylic acid derivative grafted to a polyethylene are prevented from reacting with a polyamide and a saponified ethylene-vinyl acetate copolymer by the fatty acid metal salt and, therefore, the adhesive strength of the adhesive resin composition is further improved (see Paragraph in PTL 2). In Example, a resin composition containing calcium stearate in a proportion of 300 ppm at the maximum based on 100 parts by weight of the total of a polyethylene and a modified polyethylene is shown. The proportion of calcium stearate in the resin composition is 20 ppm on a metal basis (see Example 14 in PTL 2).

In PTL 3, a resin composition is disclosed, which contains a specific proportion of hydrotalcites and 0.005 to 1.0 part by weight of a higher fatty acid salt, and is highly adhesive even though the proportion of the higher fatty acid salt is greater. In Example, a resin composition containing zinc stearate in a proportion of 0.02 parts by weight based on 100 parts by weight of a polypropylene graft-modified with maleic anhydride is shown. The proportion of zinc stearate in the resin composition is 20 ppm on a metal basis (see Example 14 in PTL 3).

RELATED ART DOCUMENTS

Patent Documents

PTL 1: JP-A-SH054(1979)-087783
PTL 2: JP-A-2003-073506
PTL 3: JP-A-2012-172047

SUMMARY OF INVENTION

In recent years, forming techniques have been advanced (e.g., feed block die configurations have been diversified, and forming machines have become more sophisticated). Further, the multilayer structures are imparted with higher functionalities, for example, by increasing the number of layers thereof. This tends to reduce the transparency of the multilayer structures. Even with the use of the conventional adhesive resin described above, the multilayer structures are liable to have insufficient transparency depending on the forming conditions.

With a recent strong demand for the safety of packaged contents, on the other hand, a multilayer structure ensuring higher visibility tends to be preferred for the packaging material, so that the packaged contents can be reliably checked through the packaging material. Therefore, there is a demand for a multilayer structure having a higher level of transparency.

In view of the foregoing, the present disclosure provides a highly transparent multilayer structure that includes a thermoplastic resin layer, a gas barrier resin layer, and an adhesive resin layer provided between the thermoplastic resin layer and the gas barrier resin layer, and further provides a resin composition for the adhesive resin layer, and a method of producing the multilayer structure.

The inventor focused on a fact that, in the multilayer structure including the thermoplastic resin layer, the gas barrier resin layer, and the adhesive resin layer provided between the thermoplastic resin layer and the gas barrier resin layer, slight interface roughness occurring in an interface between the gas barrier resin layer and the adhesive resin layer makes it impossible to achieve the higher level of transparency.

The inventor found that, where a fatty acid zinc salt (B) is selected as an additive to be added to the resin composition for the adhesive resin layer of the multilayer structure to solve the aforementioned problem and the fatty acid zinc salt (B) is present in the adhesive layer resin composition in a specific greater proportion on a metal basis, the interface roughness in the interface between the gas barrier resin layer and the adhesive resin layer can be significantly suppressed. Thus, a remarkable effect is unexpectedly created to provide the highly transparent multilayer structure.

In the conventional art, if the fatty acid metal salt is added in a greater proportion to the adhesive resin layer, the adhesiveness of the adhesive resin layer is reduced. Therefore, those skilled in the art rather avoid the addition of the greater proportion of the fatty acid metal salt. In contrast, the inventor found that the addition of the specific greater proportion of the specific metal salt is effective to significantly improve the transparency.

According to a first inventive aspect, there is provided a multilayer structure that includes a thermoplastic resin layer, a gas barrier resin layer, and an adhesive resin layer provided between the thermoplastic resin layer and the gas barrier resin layer, wherein the adhesive resin layer is formed from a resin composition containing: (A) a polyolefin resin containing at least one of a carboxyl group and an acid anhydride group; and (B) a fatty acid zinc salt, wherein the fatty acid zinc salt (B) is present in the resin composition for the adhesive resin layer in a proportion of 40 to 250 ppm on a metal basis based on the amount of the adhesive resin layer.

According to a second inventive aspect, there is provided a resin composition for an adhesive resin layer, the resin composition containing: (A) a polyolefin resin containing at least one of a carboxyl group and an acid anhydride group; and (B) a fatty acid zinc salt, wherein the fatty acid zinc salt (B) is present in a proportion of 40 to 250 ppm on a metal basis based on the amount of the resin composition.

According to a third inventive aspect, there is provided a method of producing a multilayer structure including a thermoplastic resin layer, a gas barrier resin layer, and an adhesive resin layer provided between the thermoplastic resin layer and the gas barrier resin layer, the method including: preparing a thermoplastic resin for the thermoplastic resin layer; preparing a gas barrier resin for the gas barrier resin layer; preparing a resin composition for the adhesive resin layer, the resin composition containing a polyolefin resin (A) containing at least one of a carboxyl group and an acid anhydride group, and 40 to 250 ppm of a fatty acid zinc salt (B) on a metal basis based on the amount of the resin composition; and forming the thermoplastic resin layer, the adhesive resin layer, and the gas barrier resin layer from the thermoplastic resin, the resin composition, and the gas barrier resin, respectively, by a coextrusion method or a coinjection molding method.

According to the present disclosure, the multilayer structure includes the thermoplastic resin layer, the gas barrier resin layer, and the adhesive resin layer provided between the thermoplastic resin layer and the gas barrier resin layer. The adhesive resin layer is formed from the adhesive layer resin composition containing the polyolefin resin (A) containing at least one of the carboxyl group and the acid anhydride group, and the fatty acid zinc salt (B). In the adhesive layer resin composition, the fatty acid zinc salt (B) is present in a proportion of 40 to 250 ppm on a metal basis based on the amount of the adhesive resin layer. Therefore, the multilayer structure has a higher level of transparency, because the interface roughness in the interface between the gas barrier resin layer and the adhesive resin layer can be significantly suppressed. Further, the adhesion between the gas barrier resin layer and the adhesive resin layer can be ensured.

Where the fatty acid zinc salt (B) present in the resin composition for the adhesive resin layer has a carbon number of 4 to 28, the multilayer structure has a higher level of transparency, because the interface roughness in the interface between the gas barrier resin layer and the adhesive resin layer can be more significantly suppressed. Further, the adhesion between the gas barrier resin layer and the adhesive resin layer can be reliably ensured.

Where the fatty acid zinc salt (B) present in the resin composition for the adhesive resin layer has a molar mass of 200 to 1000 g/mol, the multilayer structure has a higher level of transparency, because the interface roughness in the interface between the gas barrier resin layer and the adhesive resin layer can be more significantly suppressed. Further, the adhesion between the gas barrier resin layer and the adhesive resin layer can be more reliably ensured.

Where the polyolefin resin (A) containing at least one of the carboxyl group and the acid anhydride group has an absorbance ratio (a/b) of 0.005 to 0.5 wherein (a) is an absorbance at a peak attributable to C=O stretching vibration observed at around 1710 cm$^{-1}$ and (b) is an absorbance at a peak attributable to C—H bending vibration observed at around 1450 cm$^{-1}$ in Fourier transform infrared spectroscopy performed on the polyolefin resin (A) by a transmission method, the multilayer structure has a higher level of transparency.

Where a gas barrier resin as a material for the gas barrier resin layer is at least one of an EVOH and a polyamide resin, the multilayer structure has a higher level of transparency, and is less susceptible to the cracking of the gas barrier layer and the problem of the disposability.

Where the multilayer structure has an overall thickness of 10 to 5000 μm, the multilayer structure has a higher level of transparency, because the interface roughness in the interface between the gas barrier resin layer and the adhesive resin layer can be more significantly suppressed.

Where a thickness ratio between the gas barrier resin layer and the adhesive resin layer is (gas barrier resin layer/adhesive resin layer)=10/90 to 99/1, the multilayer structure has a higher level of transparency, because the interface roughness in the interface between the gas barrier resin layer and the adhesive resin layer can be significantly suppressed.

According to the present disclosure, the resin composition for the adhesive resin layer contains the polyolefin resin (A) containing at least one of the carboxyl group and the acid anhydride group, and the fatty acid zinc salt (B). The fatty acid zinc salt (B) is present in the resin composition in a proportion of 40 to 250 ppm on a metal basis based on the amount of the resin composition. Therefore, the adhesive resin layer formed from the resin composition has a higher level of transparency, because the interface roughness in the interface between the gas barrier resin layer and the adhesive resin layer can be significantly suppressed. Further, the adhesion between the gas barrier resin layer and the adhesive resin layer can be ensured.

According to the present disclosure, the multilayer structure production method uses the thermoplastic resin, the gas barrier resin, and the resin composition for the adhesive resin layer. The resin composition for the adhesive resin layer contains the polyolefin resin (A) containing at least one of the carboxyl group and the acid anhydride group, and the fatty acid zinc salt (B). In the resin composition for the adhesive resin layer, the fatty acid zinc salt (B) is present in a proportion of 40 to 250 ppm on a metal basis based on the amount of the resin composition. In the multilayer structure production method, the thermoplastic resin, the gas barrier resin and the adhesive layer resin composition are coextruded or coinjection-molded, whereby the multilayer structure including the adhesive resin layer provided between the thermoplastic resin layer and the gas barrier resin layer is produced. The multilayer structure thus produced has a higher level of transparency, because the interface roughness in the interface between the gas barrier resin layer and the adhesive resin layer can be significantly suppressed.

Further, the adhesion between the gas barrier resin layer and the adhesive resin layer can be ensured.

DESCRIPTION OF EMBODIMENTS

The present disclosure will be described in detail by way of preferred embodiments thereof. It should be understood that these preferred embodiments are illustrative of the disclosure but not limitative the disclosure.

The present disclosure provides a multilayer structure that includes a thermoplastic resin layer, a gas barrier resin layer, and an adhesive resin layer provided between the thermoplastic resin layer and the gas barrier resin layer. The adhesive resin layer is formed from a resin composition containing: (A) a polyolefin resin containing at least one of a carboxyl group and an acid anhydride group; and (B) a fatty acid zinc salt. In the resin composition for the adhesive resin layer, the fatty acid zinc salt (B) is present in a proportion of 40 to 250 ppm on a metal basis based on the amount of the adhesive resin layer. The present disclosure also provides the resin composition for the adhesive resin layer, and a multilayer structure production method for producing the multilayer structure by a coextrusion method or a coinjection molding method.

<Thermoplastic Resin (Thermoplastic Resin Layer)>

A generally known thermoplastic resin is usable as the thermoplastic resin for the thermoplastic resin layer of the inventive multilayer structure. Examples of the thermoplastic resin include: polyolefin resins including polyethylene resins such as linear low-density polyethylenes, low-density polyethylenes, medium-density polyethylenes, high-density polyethylenes, ionomers, ethylene-propylene copolymers, and ethylene-α-olefin (C4 to C20 α-olefin) copolymers, ethylene-acrylate copolymers, polypropylene resins such as polypropylenes and propylene-α-olefin (C4 to C20 α-olefin) copolymers, polybutenes, polypentenes, and polycycloolefins; polystyrene resins; polyester resins such as polyethylene terephthalates and polybutylene terephthalates; halogenated resins such as polyvinyl chlorides, polyvinylidene chlorides, chlorinated polyethylenes, and chlorinated polypropylenes; acryl resins; elastomers such as polyester elastomers and polyurethane elastomers; gas barrier resins such as polyvinyl alcohols, saponified ethylene-vinyl ester copolymers, and polyamide resins; and adhesive resins such as ethylene-vinyl acetate copolymers and polyolefin resins containing a carboxyl group or an acid anhydride group.

Thermoplastic resins having a relatively high hydrophobicity (the polyolefin resins, the polystyrene resins, the polyester resins, and the like) are preferably used in order to efficiently provide the effects of the present disclosure. The polyolefin resins are particularly preferred, and the polyethylene resins are especially preferred.

The density of such a polyolefin resin is not particularly limited, but is typically 0.85 g/cm$^3$ to 0.96 g/cm$^3$, preferably 0.87 g/cm$^3$ to 0.95 g/cm$^3$. The melt flow rate (MFR) of the polyolefin resin is not particularly limited, but is typically 0.01 to 50 g/10 minutes, 0.1 to 10 g/10 minutes, for formability. Where the polyolefin resin is a polyethylene resin, the melt flow rate is measured at 190° C. with a load of 2160 g. Where the polyolefin resin is a polypropylene resin, the melt flow rate is measured at 230° C. with a load of 2160 g.

The thermoplastic resin may contain a conventionally known plasticizer, filler, clay (montmorillonite or the like), colorant, antioxidant, antistatic agent, lubricant, nucleating agent, antiblocking agent, UV absorber, wax, and the like in proportions that do not impair the effects of the present disclosure (e.g., in proportions of not greater than 30 wt. %, preferably not greater than 10 wt. %, based on the weight of the thermoplastic resin).

<Gas Barrier Resin (Gas Barrier Resin Layer)>

In the present disclosure, a polyvinyl alcohol, an EVOH, a polyamide resin or the like is usable as the gas barrier resin for formation of the gas barrier resin layer. Particularly, the EVOH and the polyamide resin, which are highly transparent and less liable to cause the cracking of the gas barrier resin layer and the problem of the disposability, are preferred.

Particularly, where the inventive multilayer structure is used as a packaging material for hot water sterilizable food, the EVOH and the polyamide resin are preferably mixed together in order to prevent the EVOH from leaching from the gas barrier resin layer at an edge portion of the packaging material after the hot water sterilization process of the packaging material. The polyamide resin is capable of forming a network structure by interaction between amide bonds thereof and OH groups and/or ester groups of the EVOH, thereby preventing the leaching of the EVOH during the hot water process. Where the inventive multilayer structure is used as a packaging material for retort food and boilable food, therefore, it is preferred to mix the EVOH and the polyamide resin together.

Where the gas barrier resin is prepared by mixing the EVOH and the polyamide resin together, the weight ratio (EVOH/polyamide resin) between the EVOH and the polyamide resin to be mixed is typically 99/1 to 70/30, preferably 97/3 to 75/25, particularly preferably 95/5 to 85/15. If the weight ratio of the polyamide resin is excessively great, the long-run formability and the gas barrier property tend to be deteriorated. If the weight ratio of the polyamide resin is excessively small, the EVOH leaching suppressing effect after the hot water process tends to be deteriorated.

The EVOH to be used as the gas barrier resin in the present disclosure will be described.

The EVOH to be used in the present disclosure is generally a water-insoluble thermoplastic resin prepared by copolymerizing ethylene and a vinyl ester monomer and then saponifying the resulting copolymer. Known polymerization methods such as a solution polymerization method, a suspension polymerization method and an emulsion polymerization method maybe used for the polymerization. A solution polymerization method using methanol as a solvent is generally used. The resulting ethylene-vinyl ester copolymer may be saponified by a known method.

The EVOH to be used in the present disclosure mainly contains an ethylene structural unit and a vinyl alcohol structural unit, and further contains a small amount of a vinyl ester structural unit that remains unsaponified.

Vinyl acetate is typically used as the vinyl ester monomer because it is easily commercially available and ensures a higher impurity treatment efficiency in the production process. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters preferably have 3 to 20 carbon atoms, more preferably 4 to 10 carbon atoms, particularly preferably 4 to 7 carbon atoms. These vinyl esters may be used alone or, as required, a plurality of vinyl esters may be selected from these vinyl esters to be used in combination.

The EVOH typically has an ethylene structural unit content of 20 to 60 mol %, preferably 25 to 50 mol %, particularly preferably 25 to 40 mol %, as measured in conformity with ISO14663. If the ethylene structural unit content is excessively low, the EVOH tends to be poorer in high-humidity gas barrier property and melt formability. If the ethylene structural unit content is excessively high, on the other hand, the EVOH tends to be poorer in gas barrier property.

The EVOH typically has a vinyl ester saponification degree of 90 to 100 mol %, preferably 95 to 100 mol %, particularly preferably 99 to 100 mol %, as measured in conformity with JIS K6726 (by using a solution prepared by homogenously dissolving the EVOH in a water/methanol solvent). If the saponification degree is excessively low, the EVOH tends to be poorer in gas barrier property, heat stability, moisture resistance, and the like.

The EVOH typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR is excessively high, the EVOH tends to be poorer in film forming property. If the MFR is excessively low, the EVOH tends to have difficulty in melt extrusion.

The EVOH to be used in the present disclosure may further contain a structural unit derived from any of the following exemplary comonomers in a proportion that does not impair the effects of the present disclosure (e.g., in a proportion of not greater than 10 mol % based on the amount of the EVOH).

The exemplary comonomers include: olefins such as propylene, 1-butene, and isobutene; hydroxyl-containing α-olefins such as 2-propen-1-ol, 3-buten-1-ol, 4-penten-1-ol, 5-hexen-1-ol, 3,4-dihydroxy-1-butene, 5-hexene-1,2-diol, and 2-methylenepropane-1,3-diol, and esterification products of these hydroxyl-containing α-olefins such as 3,4-diacyloxy-1-butene; hydroxymethyl vinylidene acetates such as 2,3-diacetoxy-1-allyloxypropane, 2-acetoxy-1-allyloxy-3-hydroxypropane, 3-acetoxy-1-allyloxy-2-hydroxypropane, 1,3-diacetoxy-2-methylenepropane, 1,3-dipropionyloxy-2-methylenepropane, and 1,3-dibutyronyloxy-2-methylenepropane; glycerin mono(unsaturated alkyl) ethers such as glycerin monoallyl ether, glycerin monovinyl ether, and glycerin monoisopropenyl ether; unsaturated acids such as acrylic acid, methacrylic acid, crotonic acid, (anhydrous) phthalic acid, (anhydrous) maleic acid, and (anhydrous) itaconic acid, and salts and C1 to C18 monoalkyl or dialkyl esters thereof; acrylamide compounds such as acrylamide, C1 to C18 N-alkylacrylamides, N,N-dimethylacrylamide, 2-acrylamidopropanesulfonic acid and salts thereof, and acrylamidopropyldimethylamine and acid salts and quaternary salts thereof; methacrylamide compounds such as methacrylamide, C1 to C18 N-alkyl methacrylamides, N,N-dimethylmethacrylamide, 2-methacrylamidopropanesulfonic acid and salts thereof, and methacrylamidopropyldimethylamine and acid salts and quaternary salts thereof; N-vinylamides such as N-vinylpyrrolidone, N-vinylformamide, and N-vinylacetamide; vinyl cyanides such as acrylonitrile and methacrylonitrile; vinyl ethers such as C1 to C18 alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilane compounds such as trimethoxyvinylsilane; halogenated allyl compounds such as allyl acetate and allyl chloride; allyl alcohol compounds such as allyl alcohol and dimethoxyallyl alcohol; and trimethyl-(3-acrylamido-3-dimethylpropyl)-ammonium chloride and acrylamido-2-methylpropanesulfonic acid.

Particularly, an EVOH containing a primary hydroxyl group at its side chain is preferred because it is excellent in secondary formability and yet has a sufficient gas barrier property. An EVOH prepared by copolymerization with any of the hydroxyl-containing α-olefins is preferred, and an EVOH having a 1,2-diol structure at its side chain is particularly preferred. Where the EVOH contains the primary hydroxyl group at its side chain, the primary hydroxyl group content is typically 0.1 to 20 mol %, preferably 0.5 to 15 mol %, particularly preferably 1 to 10 mol %.

The EVOH having 1,2-diol at its side chain contains a 1,2-diol structural unit at its side chain. Specifically, the 1,2-diol structural unit is a structural unit represented by the following general formula (1):

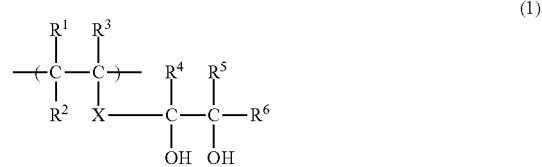

wherein R¹, R² and R³ are each independently a hydrogen atom or an organic group, X is a single bond or a bonding chain, and R⁴, R⁵ and R⁶ are each independently a hydrogen atom or an organic group.

In the 1,2-diol structural unit represented by the general formula (1), examples of the organic group include: saturated hydrocarbon groups such as a methyl group, an ethyl group, a n-propyl group, an isopropyl group, a n-butyl group, an isobutyl group, and a tert-butyl group; aromatic hydrocarbon groups such as a phenyl group and a benzyl group; and halogen atoms, a hydroxyl group, acyloxy groups, alkoxycarbonyl groups, carboxyl groups, and a sulfonic acid group.

A "post-modified" EVOH such as an urethanized, acetalized, cyanoethylated or oxyalkylenated EVOH may be used as the EVOH.

The EVOH to be used in the present disclosure may be a mixture of different EVOHs. These EVOHs may have different ethylene structural unit contents, different side chain primary hydroxyl group contents, different saponification degrees, and different melt flow rates (MFR), and contain different comonomer components.

Next, the polyamide resin to be used as the gas barrier resin in the present disclosure will be described.

Known polyamide resins are usable as the polyamide resin in the present disclosure. Specific examples of the polyamide resins include: polyamide homopolymers such as polycapramide (nylon 6), poly-ω-aminoheptanoic acid (nylon 7), poly-w-aminononanoic acid (nylon 9), polyundecanamide (nylon 11), and polylauryllactam (nylon 12); polyamide copolymer resins including aliphatic polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), ethylenediamine adipamide/hexamethylenediammonium adipate copolymers (nylon 26/66), caprolactam/hexanethylenediammonium adipate/hexamethylenediammonium sebacate copolymers (nylon 66/610), and ethyleneammonium adipate/hexamethylenediammonium adipate/hexamethylenediammonium sebacate copolymers (nylon 6/66/610), and aromatic polyamides such as polyhexamethylene isophthalamide, polyhexamethylene terephthalamide, poly-m-xylylene adipamide, hexamethylene isophthalamide/terephthalamide copolymers, poly-p-phenylene terephthalamide, and poly-p-phenylene/3',4'-diphenyl ether terephthalamide; and amorphous polyamides, polyamide resins obtained by modifying any of these polyamide resins with an aromatic amine such as methylenebenzylamine or m-xylenediamine, and m-xylylenediammonium adipate. These polyamide resins may be terminal-modified. A polyamide resin obtained by terminal-modifying any of these polyamide resins is preferred.

Specific examples of the terminal-modified polyamide resin include polyamide resins terminal-modified with a C1 to C22 hydrocarbon group, and commercially available ones may be used. More specifically, it is preferred to use a terminal-modified polyamide resin that satisfies the following expression:

$$100 \times Y/(X+Y) \geq 5$$

wherein X is the number of terminal COOH groups of the terminal-modified polyamide resin, and Y is the number of terminal CONR¹R² groups of the terminal-modified polyamide resin (wherein R¹ is a C1 to C22 hydrocarbon group, and R² is a hydrogen atom or a C1 to C22 hydrocarbon group).

The terminal-modified polyamide resin is such that carboxyl groups of an ordinary unmodified polyamide resin are modified into N-substituted amides by a terminal controlling agent and the number of the modified carboxyl groups accounts for not less than 5% of the total number of the carboxyl groups of the unmodified polyamide resin. If the number of the modified carboxyl groups is excessively small, a greater number of carboxyl groups are left unmodified in the polyamide resin. The unmodified carboxyl groups are liable to react with the EVOH in the melt-forming process to cause gelation, so that the resulting film tends to have poorer appearance. The terminal-modified polyamide resin may be produced, for example, by a method described in JP-B2-HEI8(1996)-19302.

As described above, the gas barrier resin to be used in the present disclosure may be a gas barrier resin composition prepared by mixing any of the aforementioned gas barrier resins. In this case, the proportion of the gas barrier resin in the gas barrier resin composition is typically not less than 70 wt. %, preferably not less than 80 wt. %, particularly preferably not less than 90 wt. %, based on the weight of the gas barrier resin composition. If the proportion of the gas barrier resin is excessively small, it will be impossible to sufficiently provide the effects of the present disclosure.

The gas barrier resin to be used in the present disclosure may contain a conventionally known plasticizer, filler, clay (montmorillonite or the like), colorant, antioxidant, antistatic agent, lubricant, nucleating agent, antiblocking agent, UV absorber, wax, and the like in proportions that do not impair the effects of the present disclosure (e.g., in proportions of not greater than 30 wt. %, preferably not greater than 10 wt. %, based on the weight of the gas barrier resin).

<Adhesive Layer Resin Composition (Adhesive Resin Layer)>

In the present disclosure, the adhesive resin layer (the adhesive layer resin composition) contains the polyolefin resin (A) containing at least one of the carboxyl group and the acid anhydride group, and the fatty acid zinc salt (B), and the fatty acid zinc salt (B) is present in the specific greater proportion on a metal basis. Thus, the multilayer structure has a higher level of transparency, because the interface roughness in the interface between the gas barrier resin layer and the adhesive resin layer can be significantly suppressed. Further, the adhesion in the interface between the gas barrier resin layer and the adhesive resin layer in the multilayer structure can be ensured. Thus, an unexpected effect is provided.

The reason for this effect is not clear, but this effect is supposedly because the fatty acid zinc salt present in the adhesive resin layer in the specific greater proportion on a metal basis makes it possible to properly suppress the interaction between the gas barrier resin layer and the adhesive resin layer in a melted state in a multilayer structure producing process while minimizing the deactivation of the carboxyl group or the acid anhydride group in the adhesive resin layer. This effect is remarkably improved by the fatty acid zinc salt, and is not created by the other fatty acid metal salts.

<Polyolefin Resin (A) Containing At Least One of Carboxyl Group and Acid Anhydride Group>

The polyolefin resin (A) containing at least one of the carboxyl group and the acid anhydride group to be used for the resin composition for the adhesive resin layer of the inventive multilayer structure (hereinafter referred to as "polyolefin resin (A)") will be described. The polyolefin resin (A) is known as an adhesive resin, and is prepared, for example, by copolymerizing an olefin monomer and a monomer having a carboxyl group or an acid anhydride group, or by grafting a monomer having a carboxyl group or an acid anhydride group to a polyolefin resin.

Examples of the monomer having the carboxyl group include unsaturated carboxylic acids such as unsaturated dicarboxylic acids and unsaturated monocarboxylic acids. Specific examples of the unsaturated dicarboxylic acids include maleic acid, fumaric acid, chloromaleic acid, himic acid, citraconic acid, and itaconic acid. Specific examples of the unsaturated monocarboxylic acids include acrylic acid, butanoic acid, crotonic acid, vinylacetic acid, methacrylic acid, pentenoic acid, dodecenoic acid, linoleic acid, angelic acid, and cinnamic acid, which may be used alone or in combination.

The monomer having the acid anhydride group is an unsaturated carboxylic acid anhydride. Examples of the unsaturated carboxylic acid anhydride include anhydrides of the unsaturated dicarboxylic acids and the unsaturated monocarboxylic acids described above. Specific examples of the unsaturated carboxylic acid anhydride include maleic anhydride, himic anhydride, itaconic anhydride, citraconic anhydride, and acrylic anhydride, which may be used alone or in combination. Of these carboxylic acid anhydrides, maleic anhydride is particularly preferred because it ensures proper adhesion with respect to the gas barrier resin layer.

Any of the following polyolefin resins may be used as a polyolefin resin material (hereinafter referred to as "base resin") for the polyolefin resin (A).

Examples of the base resin include ethylene homopolymers, propylene homopolymers, copolymers of ethylene and some other monomer, and copolymers of propylene and some other monomer. Examples of the other monomer include C3 to C20 α-olefins such as ethylene, propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, 1-decene, and 1-octadecene, vinyl acetate, vinyl alcohol, (meth)acrylic acid, and (meth)acrylic esters. Here, the term "(meth)acrylic" means at least one of acrylic and methacrylic.

Other examples of the base resin include: ethylene polymers including ethylene homopolymers such as low-density polyethylenes (LDPE) produced by a high-pressure method and high-density polyethylenes (HDPE), ethylene-α-olefin copolymers such as ethylene-propylene copolymers, ethylene-butene copolymers, ethylene-hexene copolymers, ethylene-octene copolymers, ethylene-propylene-butene copolymers, ethylene-propylene-hexene copolymers, ethylene-propylene-octene copolymers, ethylene-butene-hexene copolymers, ethylene-butene-octene copolymers, and ethylene-hexene-octene copolymers, ethylene-vinyl acetate copolymers, ethylene-(meth)acrylic acid copolymers, ethylene-methyl (meth)acrylate copolymers, ethylene-ethyl (meth)acrylate copolymers, and ethylene-(meth)acrylic acid-methyl (meth)acrylate copolymers; propylene polymers such as propylene homopolymers, propylene-ethylene random copolymers, propylene-butene random copolymers, propylene-ethylene-hexene random copolymers, propylene-ethylene-octene random copolymers, propylene-butene-hexene random copolymers, propylene-butene-octene random copolymers, propylene-hexene-octene random copolymers, and propylene-ethylene block copolymers; and butene polymers.

Here, the ethylene polymers, the propylene polymers and the butene polymers each mean a resin containing an ethylene monomer unit, a propylene monomer unit or a butene monomer unit in a proportion of not less than 50 mol % based on the total amount of the monomer units. These polyolefin resins may be used alone or in combination.

Among these polymers, the ethylene homopolymers, ethylene-α-olefin copolymers, and ethylene-vinyl acetate copolymers out of the ethylene polymers, and the propylene homopolymers and the propylene-ethylene random copolymers out of the propylene polymers are preferred because they are easily available at lower costs and excellent in economy. Further, the ethylene homopolymers, the ethylene-α-olefin copolymers, the polypropylene homopolymers, and the propylene-ethylene random copolymers are preferred from the viewpoint of mechanical properties.

From the viewpoint of the adhesion to the gas barrier resin layer, a resin prepared by graft-modifying the base resin with at least one of the unsaturated carboxylic acid and the unsaturated carboxylic acid anhydride is preferably used as the polyolefin resin (A) in the present disclosure.

The term "graft-modifying" means that at least one of the unsaturated carboxylic acid and the unsaturated carboxylic acid anhydride is not used as a comonomer for the base resin, but is bonded to the existing base resin through a reaction. In the present disclosure, the term "graft-modifying" means not only that at least one of the unsaturated carboxylic acid and the unsaturated carboxylic acid anhydride is introduced as a longer side chain to the skeleton of the base resin, but also that at least one of the unsaturated carboxylic acid and the unsaturated carboxylic acid anhydride is chemically bonded to the base resin.

The graft modification of the base resin may be performed by any of various conventionally known methods. The modification method is not particularly limited, but exemplary modification methods include: a melt modification method that includes melting the base resin and adding at least one of the unsaturated carboxylic acid and the unsaturated carboxylic acid anhydride to the melted base resin for graft copolymerization; and a solution modification method that includes dissolving the base resin in a solvent, and adding at least one of the unsaturated carboxylic acid and the unsaturated carboxylic acid anhydride to the resulting base resin solution for graft copolymerization. Of these methods, the melt modification method that does not employ the solvent is preferred for cleanliness, and an extruder is preferably used for the graft modification. The graft modification can be efficiently performed in the presence of a radical initiator.

The polyolefin resin (A) may include the graft-modified base resin alone, or may be a mixture of the graft-modified base resin and an unmodified base resin of the same type or different types.

The density of the polyolefin resin (A) is not particularly limited, but is typically 0.85 g/cm$^3$ to 0.96 g/cm$^3$, preferably 0.87 g/cm$^3$ to 0.95 g/cm$^3$. The melt flow rate (MFR) of the polyolefin resin (A) is not particularly limited, but is typically 0.01 to 50 g/10 minutes, preferably 0.1 to 10 g/10 minutes, for formability. Where the base resin is an ethylene polymer or a butene polymer, the MFR of the polyolefin resin (A) is determined at 190° C. with a load of 2160 g.

Where the base resin is a propylene polymer, the MFR of the polyolefin resin (A) is determined at 230° C. with a load of 2160 g.

<Fatty Acid Zinc Salt (B)>

Examples of the fatty acid zinc salt (B) to be used for the resin composition for the adhesive resin layer of the inventive multilayer structure include zinc butyrate, zinc caproate, zinc caprylate, zinc pelargonate, zinc caprate, zinc undecanoate, zinc laurate, zinc myristate, zinc palmitate, zinc stearate, zinc 12-hydroxystearate, zinc arachidate, zinc behenate, zinc lignocerate, zinc cerotate, and zinc montanate. A saturated fatty acid salt is preferred, and a chain saturated fatty acid zinc salt is more preferred as the fatty acid zinc salt (B) for productivity. The fatty acid zinc salt (B) typically has a carbon number of 4 to 28. The fatty acid zinc salt (B) preferably has a carbon number of 6 to 24, particularly preferably 8 to 22, in order to ensure proper heat resistance and to provide the effects of the present disclosure even if a fatty acid zinc salt having a higher zinc metal content per unit amount is used in a relatively small amount as the fatty acid zinc salt (B). Different types of fatty acid zinc salts may be selected from the aforementioned fatty acid zinc salts and used in combination as the fatty acid zinc salt (B).

The fatty acid zinc salt (B) typically has a molar mass of 200 to 1000 g/mol. The molar mass of the fatty acid zinc salt (B) is preferably 250 to 850 g/mol, particularly preferably 350 to 750 g/mol, in order to ensure proper heat resistance and to provide the effects of the present disclosure even if a fatty acid zinc salt having a higher zinc metal content per unit amount is used in a relatively small amount as the fatty acid zinc salt (B).

The proportion of the fatty acid zinc salt (B) is typically 40 to 250 ppm, preferably 45 to 225 ppm, more preferably 80 to 200 ppm, on a metal basis based on the amount of the adhesive resin layer. If the proportion of the fatty acid zinc salt (B) is excessively small, the adhesive resin layer tends to be poorer in transparency. If the proportion of the fatty acid zinc salt (B) is excessively great, the adhesive resin layer tends to have a poorer adhesive force with respect to the gas barrier resin layer.

The proportion of the fatty acid zinc salt (B) on a metal basis based on the amount of the adhesive resin layer is determined, for example, by precisely weighing a dry specimen, putting the weighed specimen in a platinum evaporation dish having a known weight, carbonizing the specimen in the dish by an electric heater, burning the specimen in the dish by a gas burner until no smoke emanates, putting the platinum evaporation dish in an electric furnace, elevating the temperature of the furnace to completely ash the specimen, cooling the ashed specimen, adding hydrochloric acid and purified water to the ashed specimen, dissolving the ashed specimen in hydrochloric acid and water with heating by the electric heater, putting the resulting solution in a measuring flask, filling the measuring flask to a predetermined volume with purified water, and using the resulting solution as a sample for atomic absorption spectrometry. Thus, the proportion of the fatty acid zinc salt (B) is measured on a metal basis by the atomic absorption spectrometry.

<(C) Oxygen Scavenger>

The resin composition for the adhesive resin layer of the inventive multilayer structure may contain an oxygen scavenger (C) for absorbing oxygen in addition to the polyolefin resin (A) and the fatty acid zinc salt (B).

The oxygen scavenger (C) is a compound that traps oxygen more quickly than a content to be packaged with the inventive multilayer structure. Specific examples of the oxygen scavenger (C) include an inorganic oxygen scavenger, an organic oxygen scavenger, and a composite oxygen scavenger that employs an inorganic catalyst (transition metal catalyst) and an organic compound in combination. These oxygen scavengers may be used alone or in combination.

The inorganic oxygen scavenger may be a metal or a metal compound that reacts with oxygen to absorb oxygen. Preferred examples of the metal include metals having a higher ionization tendency than hydrogen (e.g., Fe, Zn, Mg, Al, K, Ca, Ni, Sn, and the like). The metal is typically iron. These metals are preferably used in a powdery form. Conventionally known iron powders such as reduced iron powder, atomized iron powder, and electrolyzed iron powder are usable irrespective of the production method without particular limitation. Iron to be used may be iron once oxidized and then reduced. The metal compound is preferably an oxygen deficient type metal compound. Examples of the oxygen deficient type metal compound include cerium oxide ($CeO_2$), titanium oxide ($TiO_2$), and zinc oxide (ZnO). These metal oxides are reduced into an oxygen deficient state with oxygen extracted from crystal lattices thereof, and react with oxygen in an atmosphere, thereby exhibiting the oxygen absorbing capability. These metals and metal compounds preferably each contain a halogenated metal or the like as a reaction promoter.

Examples of the organic oxygen scavenger include hydroxyl-containing compounds, quinone compounds, double bond-containing compounds, and oxidizable resins. Hydroxyl groups or double bonds contained in these organic oxygen scavengers react with oxygen to absorb oxygen. Preferred examples of the organic oxygen scavenger include ring-opening polymers of cycloalkenes such as polyoctenylenes, and conjugated diene polymers such as of butadiene and their cyclization products.

The proportion of the oxygen scavenger (C) is typically 1 to 30 wt. %, preferably 3 to 25 wt. %, more preferably 5 to 20 wt. %, based on the weight of the adhesive layer resin composition.

<(D) Other Additives>

The resin composition for the adhesive resin layer of the inventive multilayer structure may contain known additives in addition to the aforementioned ingredients in proportions that do not impair the effects of the present disclosure (e.g., in proportions of not greater than 5 wt. % based on the overall weight of the adhesive layer resin composition). Examples of the additives include: a plasticizer such as an aliphatic polyhydric alcohol (e.g., ethylene glycol, glycerin, hexanediol, or the like); a higher fatty acid ester having a carbon number of not less than 12 (e.g., a methyl ester, an isopropyl ester, a butyl ester, an octyl ester or the like of a higher fatty acid), a higher fatty acid amide (e.g., a saturated fatty acid amide such as stearamide, behenamide, or the like, an unsaturated fatty acid amide such as oleamide, erucamide, or the like, and a bis-fatty acid amide such as ethylene bis(stearamide), ethylene bis(oleamide), ethylene bis(erucamide), ethylene bis(lauramide), or the like), a higher fatty acid alkali metal salt (e.g., a lithium salt, a sodium salt, a potassium salt, or the like), a higher fatty acid alkali earth metal salt other than the zinc salt (e.g., a calcium salt, a magnesium salt, or the like) ; a lubricant such as a fluorinated ethylene resin; an anti-blocking agent; an antioxidant; a colorant; an antistatic agent; an antibacterial agent; an insoluble inorganic salt (e.g., hydrotalcites or the like); a surfactant; and a conjugated polyene compound. These may be used alone or in combination.

The resin composition for the adhesive resin layer of the inventive multilayer structure may contain a resin other than the polyolefin resin (A) having the carboxyl group or the acid anhydride group in a proportion that does not impair the effects of the present disclosure (typically in a proportion of not greater than 30 wt. %, preferably not greater than 20 wt. %, particularly preferably not greater than 10 wt. %, based on the weight of the adhesive layer resin composition). If the proportion of the other resin is excessively great, the effects of the present disclosure tend to be insufficient.

In the resin composition for the adhesive resin layer of the inventive multilayer structure, the proportion of the polyolefin resin (A) is typically not less than 70 wt. %, preferably not less than 80 wt. %, particularly preferably not less than 90 wt. %, especially preferably not less than 95 wt. %, based on the overall weight of the resin composition. If the proportion of the polyolefin resin (A) is excessively small, the effects of the present disclosure tend to be insufficient.

<Method for Preparing Resin Composition for Adhesive Resin Layer>

The method for preparing the resin composition for the adhesive resin layer of the inventive multilayer structure is not particularly limited, but the resin composition may be prepared by blending the fatty acid zinc salt (B) with the polyolefin resin (A) by a known method. The resin composition may be prepared during a multilayer structure forming process, for example, by preliminarily blending these ingredients together before feeding the ingredients into a multilayer structure forming machine, by blending these ingredients in a feeder to feed the ingredients into a multilayer structure forming machine, or by melting the polyolefin resin (A) in a multilayer structure forming machine and side-feeding the fatty acid zinc salt (B) to the forming machine. For productivity, in particular, the ingredients are preferably blended together before being fed into the multilayer structure forming machine.

Where the ingredients are preliminarily blended together before being fed into the multilayer structure forming machine, the resin composition is preferably prepared in the form of pellets containing the polyolefin resin (A) and the fatty acid zinc salt (B) for improvement of the productivity in the production of the inventive multilayer structure. In this case, the fatty acid zinc salt (B) may be present within pellets of the polyolefin resin (A) and/or on outer surfaces of the pellets of the polyolefin resin (A).

Specifically, exemplary methods for allowing the fatty acid zinc salt (B) to be present within the pellets of the polyolefin resin (A) include:

(I) a method that includes mixing the polyolefin resin (A) and the fatty acid zinc salt (B) together, and then melt-kneading the resulting mixture;
(II) a method that includes adding the fatty acid zinc salt (B) to a solution of the polyolefin resin (A), mixing the fatty acid zinc salt (B) with the solution, and removing a solvent from the solution; and
(III) a method that includes adding the polyolefin resin (A) to a solution of the fatty acid zinc salt (B) to impregnate the polyolefin resin (A) with the fatty acid zinc salt solution, and drying the resulting polyolefin resin (A). Particularly, the method (I) is practical for productivity and economy, and, therefore, industrially preferred.

In the method (I), a known melt-kneading apparatus such as a kneader, an extruder, a mixing roll, a Banbury mixer, or a Plast mill may be used for the melt kneading. The polyolefin resin (A) and the fatty acid zinc salt (B) are typically melt-kneaded at 150° C. to 300° C., preferably 180° C. to 280° C., for about 1 minute to about 20 minutes. Particularly, it is industrially advantageous to use a single screw extruder or a twin screw extruder, because the pellets can be easily prepared. As required, the extruder is preferably provided with a vent suction apparatus, a gear pump apparatus, a screen apparatus and/or the like. Particularly, the extruder may be provided with one or more vent holes to reduce the pressure by suction for removal of water and side products (thermally decomposed low-molecular weight substances and the like), or an inert gas such as nitrogen may be continuously fed into a hopper for prevention of intrusion of oxygen into the extruder. Thus, a resin composition having a higher quality and substantially free from thermal coloration and thermal degradation can be prepared for the adhesive resin layer.

The method for feeding the polyolefin resin (A) and the fatty acid zinc salt (B) into the melt-kneading apparatus such as the extruder is not particularly limited. Exemplary methods for the feeding include:

(1) a method that includes dry-blending the polyolefin resin (A) and the fatty acid zinc salt (B), and feeding the resulting blend into the extruder;
(2) a method that includes feeding the polyolefin resin (A) into the extruder, melting the polyolefin resin (A), and feeding the fatty acid zinc salt (B) in a solid state into the extruder (solid side feeding method); and
(3) a method that includes feeding the polyolefin resin (A) into the extruder, melting the polyolefin resin (A), and feeding the fatty acid zinc salt (B) in a melted state into the extruder (melt side feeding method). Particularly, the method (1) is practical because of the simplicity of the apparatus and the costs of the blend.

A known method may be used for the formation of the pellets of the adhesive layer resin composition after the melt kneading. Examples of the method include a strand cutting method, a hot cutting method, and an under-water cutting method. The strand cutting method is preferred for industrial productivity.

The pellets each have any shape. Exemplary shapes of the pellets include a spherical shape, an oval shape, a cylindrical shape, a cubic shape, and a square prism shape. The pellets typically each have an oval shape or a cylindrical shape. The oval pellets typically each have a minor diameter of 1 to 6 mm, preferably 2 to 5 mm, and typically each have a major diameter of 1 to 6 mm, preferably 2 to 5 mm, for easy handling when the pellets are later used as a forming material. The cylindrical pellets typically each have a bottom diameter of 1 to 6 mm, preferably 2 to 5 mm, and typically each have a length of 1 to 6 mm, preferably 2 to 5 mm.

The pellets of the adhesive layer resin composition typically have a water content of 0.001 to 5 wt. %, preferably 0.01 to 2 wt. %, particularly preferably 0.1 to 1 wt. %. If the water content is excessively low, the resin composition tends to be poorer in long-run formability. If the water content is excessively high, the resin composition is liable to be foamed in the extrusion process.

The water content of the pellets of the adhesive layer resin composition is measured and calculated by the following method:

[Water Content Measurement Method]

The weight W1 (g) of the pellets of the adhesive layer resin composition is measured by an electronic balance, and the resin composition pellets are dried at 150° C. for 5 hours in a hot air dryer and cooled for 30 minutes in a desiccator. Then, the weight W2 (g) of the resulting pellets is measured.

The water content of the resin composition pellets is calculated from the following expression:

Water content (%)={(W1−W2)/W1}×100

Exemplary methods for allowing the fatty acid zinc salt (B) to be present on the outer surfaces of the pellets of the polyolefin resin (A) include:
(i) a method that includes dry-blending the fatty acid zinc salt (B) with the pellets of the polyolefin resin (A);
(ii) a method that includes heating the pellets of the polyolefin resin (A), and blending the fatty acid zinc salt (B) in a melted state with the heated polyolefin resin pellets;
(iii) a method that includes allowing the pellets of the polyolefin resin (A) to contain a small amount of silicone oil or the like, and blending the fatty acid zinc salt (B) with the resulting polyolefin resin pellets;
(iv) a method that includes allowing the pellets of the polyolefin resin (A) to contain a liquid plasticizer such as glycerin, and blending the fatty acid zinc salt (B) with the resulting polyolefin resin pellets; and
(v) a method that includes dissolving the fatty acid zinc salt (B) in a small amount of a solvent, and blending the resulting solution with the pellets of the polyolefin resin (A). The method (i) is industrially preferred. The method (i) will be described more specifically not by way of limitation.

Where the fatty acid zinc salt (B) is allowed to adhere to the surfaces of the pellets of the polyolefin resin (A), the water content of the pellets is preferably controlled to 0.1 to 5 wt. % (more preferably 0.5 to 4 wt. %, particularly preferably 1 to 3 wt. %) for improvement of the adhesion of the fatty acid zinc salt (B). If the water content is excessively low, the fatty acid zinc salt (B) is liable to be separated from the pellets, resulting in uneven adhesion (attaching) distribution. If the water content is excessively high, the fatty acid zinc salt (B) is liable to agglomerate, also resulting in uneven adhesion (attaching) distribution.

A known mixing apparatus such as a rocking mixer, a ribbon blender, or a line mixer may be used for the blending.

Thus, the resin composition for the adhesive resin layer of the inventive multilayer structure can be prepared.

The absorbance ratio (a/b) between an absorbance (a) at a peak attributable to C═O stretching vibration observed at around 1710 cm$^{-1}$ and an absorbance (b) at a peak attributable to C—H bending vibration observed at around 1450 cm$^{-1}$ in Fourier trans form infrared spectroscopy performed on a 90-μm thick film of the adhesive layer resin composition by a transmission method is typically 0.005 to 0.5, preferably 0.01 to 0.1, particularly preferably 0.03 to 0.08. If the absorbance ratio (a/b) is excessively high, the multilayer structure tends to have poorer appearance such as fish eyes and inclusion of foreign matter. If the absorbance ratio (a/b) is excessively low, the multilayer structure tends to have a lower adhesive strength.

The absorbance ratio (a/b) serves as an index of a carboxyl group content or an acid anhydride group content of the adhesive layer resin composition. That is, a higher absorbance ratio means a higher hydroxyl group content or a higher acid anhydride group content.

The absorbance ratio (a/b) of the adhesive layer resin composition is calculated based on measurement performed under the following conditions.

The adhesive layer resin composition is dried with heating at 100° C. for 3 hours, and sliced into a 90-μm thick test piece by means of a microtome. The adhesive layer resin composition to be used at this time may be in a pellet form or in a film form. The resulting test piece is analyzed by a transmissive method by means of a Fourier transform infrared spectrophotometer (FT-IR), whereby the absorbance (a) at the peak attributable to C═O stretching vibration observed at around 1710 cm$^{-1}$ and the absorbance (b) at the peak attributable to C—H bending vibration observed at around 1450 cm$^{-1}$ are measured. Based on the measurement values, the absorbance ratio (a/b) is calculated.

<Multilayer Structure Production Method>

A known melt-forming method may be used for production of the inventive multilayer structure. Where a coinjection molding method, a coextrusion method or the like in which the gas barrier resin and the adhesive layer resin composition are brought into contact with each other in a melted state is used in the present disclosure, the effects of the present disclosure can be efficiently provided.

Exemplary forming methods in which the gas barrier resin and the adhesive layer resin composition are brought into contact with each other in the melted state include: a method in which the gas barrier resin, the thermoplastic resin and the adhesive layer resin composition are coextruded; a method in which a film, a sheet or the like of the thermoplastic resin is laminated with the gas barrier resin and the adhesive layer resin composition by melt extrusion; and a method in which a film, a sheet or the like of the gas barrier resin is laminated with the thermoplastic resin and the adhesive layer resin composition by melt extrusion. Of these methods, the coextrusion method is preferred in consideration of costs and environmental concerns. A temperature for the melt forming is typically selected from a range of 150° C. to 300° C., preferably 180° C. to 250° C.

The inventive multilayer structure may be further subjected to a (heat) stretching process as required. The stretching process may be a uniaxial stretching process or a biaxial stretching process. The biaxial stretching process may be a simultaneous stretching process or a sequential stretching process. A roll stretching method, a tenter stretching method, a tubular stretching method, a stretch blowing method or a vacuum pressure forming method having a higher stretch ratio may be employed for the stretching process. A temperature for the stretching is typically selected from a range of about 40° C. to about 170° C., preferably about 60° C. to about 160° C. If the stretching temperature is excessively low, poorer stretchability will result. If the stretching temperature is excessively high, it will be difficult to ensure stable stretching.

The resulting multilayer structure may be further subjected to a heat-setting process to ensure dimensional stability after the stretching. The heat-setting process may be performed by known means. For example, the stretched multilayer structure (stretched film) is typically heat-treated at 80° C. to 180° C., preferably at 100° C. to 165° C., for about 2 to about 600 seconds, while being kept tense.

Where the stretched multilayer film produced by using the inventive multilayer structure is used as a shrinkable film, the stretched film may be cold-set so as to be imparted with a heat-shrinkable property, for example, by applying cold air over the stretched film without performing the above heat-setting process.

In some case, a cup-shaped or tray-shaped multilayer container may be produced from the inventive multilayer structure. For the production of the multilayer container, an ordinary drawing process is employed. Specific examples of the drawing process include a vacuum forming method, a pressure forming method, a vacuum pressure forming method, and a plug-assisted vacuum pressure forming method. Where a tube-shaped or bottle-shaped multilayer container is produced from a multilayer parison (a hollow tubular preform to be blown), a blow molding process is employed. Specific examples of the blow molding process include an extrusion blow molding method (a twin head type, a mold shift type, a parison shift type, a rotary type, an accumulator type, a horizontal parison type, and the like), a cold parison blow molding method, an injection blow molding method, and a biaxial stretching blow molding method (an extrusion type cold parison biaxial stretching blow molding method, an injection type cold parison biaxial stretching blow molding method, an injection inline type biaxial stretching blow molding method, and the like).

As required, the inventive multilayer structure may be subjected to a heating process, a cooling process, a rolling process, a printing process, a dry laminating process, a solution or melt coating process, a bag forming process, a deep drawing process, a box forming process, a tube forming process, a splitting process, or the like.

<Multilayer Structure>

The inventive multilayer structure produced by any of the aforementioned production methods has a layered configuration such that the adhesive resin layer is provided between the thermoplastic resin layer and the gas barrier resin layer in adjoining relation.

Where the gas barrier resin layer, the adhesive resin layer, and the thermoplastic resin layer are designated by $\alpha$, $\beta$, and $\gamma$, respectively, possible combinations of these layers for the layered configuration of the multilayer structure include, for example, $\alpha/\beta/\gamma$, $\gamma/\beta/\alpha/\beta/\gamma$, $\gamma/\beta/\alpha/\alpha/\beta/\gamma$, $\beta/\beta/\alpha/\beta/\alpha/\beta/\gamma$, and the like. The multilayer structure may include a recycle layer obtained by recycling cutoff pieces and defective products occurring during the production of the multilayer structure and melt-forming the recycled material, i.e., a mixture including the gas barrier resin and the thermoplastic resin. The recycle layer is regarded as a thermoplastic layer in the inventive multilayer structure. Where the recycle layer is designated by R, possible combinations of the layers for the layered configuration include, for example, $\alpha/\beta/R$, $\alpha/\beta/R/\gamma$, $\gamma/\alpha/\beta/R$, $R/\beta/\alpha/\beta/R$, $\gamma/R/\beta/\alpha/\beta/R/\gamma$, and the like.

The gas barrier resin and the adhesive resin described above may be used for the thermoplastic resin layer of the inventive multilayer structure. Therefore, $\gamma$ may be replaced with $\alpha$ and $\beta$ in the aforementioned layered configuration. Possible combinations of the layers for the layered configuration include, for example, $\alpha/\ominus/\alpha$, $\alpha/\beta/\beta$, $\alpha/\beta/\alpha/\beta/\alpha$, $\beta/\alpha/\beta/\beta$, $\alpha/\beta/\alpha/\alpha/\beta/\alpha$, $\gamma/\gamma/\alpha/\gamma/\beta/\alpha$, $\gamma/\beta/\alpha/\beta/\alpha/\beta/\gamma$, and the like.

Where the thermoplastic resin layer, the adhesive resin layer, and the gas barrier layer each include plural layers, the resin types and the formulations of these plural layers may be the same or different.

The thickness of the inventive multilayer structure (or the stretched multilayer structure) and the thicknesses of the adhesive resin layer, the gas barrier resin layer, and the thermoplastic layer of the multilayer structure are properly set according to the layered configuration, the type of the base resin of the adhesive layer resin composition, the type of the gas barrier resin, the type of the thermoplastic resin, and the use purpose, the package shape, the required physical properties, and the like of the multilayer structure. Where any of the adhesive resin layer, the gas barrier resin layer, and the thermoplastic resin layer includes two or more layers, the following thickness value is the total thickness of the layers of the same type.

The thickness of the inventive multilayer structure (or the stretched multilayer structure) may be properly selected according to the use purpose, but is typically 10 to 5000 μm, preferably 30 to 3000 μm, particularly preferably 50 to 2000 μm. Where the thickness of the multilayer structure falls within the aforementioned range, the effects of the present disclosure can be more efficiently provided.

The thickness of the adhesive resin layer is typically 0.5 to 250 μm, preferably 1 to 150 μm, particularly preferably 3 to 100 μm. Where the thickness of the adhesive resin layer falls within the aforementioned range, the effects of the present disclosure can be more efficiently provided.

The thickness of the gas barrier resin layer is typically 1 to 500 μm, preferably 3 to 300 μm, particularly preferably 5 to 200 μm. If the thickness of the gas barrier resin layer is excessively small, the multilayer structure tends to be poorer in gas barrier property. If the thickness of the gas barrier resin layer is excessively great, the multilayer structure tends to have an excessive gas barrier property and requires the ingredients in amounts greater than necessary, resulting in poorer economy.

The thickness of the thermoplastic resin layer is typically 5 to 3000 μm, preferably 10 to 2000 μm, particularly preferably 20 to 1000 μm. Where the thickness of the thermoplastic resin layer falls within the aforementioned range, the effects of the present disclosure can be more efficiently provided.

The thickness ratio between the gas barrier resin layer and the adhesive resin layer of the multilayer structure (gas barrier resin layer/adhesive resin layer) (if these layers each include a plurality of layers, the thickness ratio between the thinnest one of the gas barrier resin layers and the thinnest one of the adhesive resin layers) is typically 10/90 to 99/1, preferably 20/80 to 95/5, particularly preferably 50/50 to 90/10, especially preferably 70/30 to 90/10. Where the thickness ratio between the gas barrier resin layer and the adhesive resin layer falls within the aforementioned range, the effects of the present disclosure can be more efficiently provided.

The thickness ratio between the thermoplastic resin layer and the adhesive resin layer of the multilayer structure (thermoplastic resin layer/adhesive resin layer) (if these layers each include a plurality of layers, the thickness ratio between the thinnest one of the thermoplastic resin layers and the thinnest one of the adhesive resin layers) is typically 10/90 to 99/1, preferably 20/80 to 95/5, particularly preferably 50/50 to 90/10, especially preferably 80/20 to 90/10. Where the thickness ratio between the thermoplastic resin layer and the adhesive resin layer falls within the aforementioned range, the effects of the present disclosure can be more efficiently provided. Where the thermoplastic resin layer is formed from the gas barrier resin, the aforementioned thickness ratio between the thermoplastic resin layer and the adhesive resin layer does not apply, but only the thickness ratio between the gas barrier resin layer and the adhesive resin layer is taken into consideration.

The thickness ratio between the thermoplastic resin layer and the gas barrier resin layer of the multilayer structure (thermoplastic resin layer/gas barrier resin layer) (if these layers each include a plurality of layers, the thickness ratio between the thinnest one of the thermoplastic resin layers and the thinnest one of the gas barrier resin layers) is typically 50/50 to 99/1, preferably 60/40 to 95/5, particularly preferably 70/30 to 90/10. Where the thickness ratio between the thermoplastic resin layer and the gas barrier resin layer falls within the aforementioned range, the effects of the present disclosure can be more efficiently provided. Where the thermoplastic resin layer is formed from the gas barrier resin, the aforementioned thickness ratio between the thermoplastic resin layer and the gas barrier resin layer does not apply.

The inventive multilayer structure produced in the aforementioned manner is useful as a packaging material. Bags, cups, trays, tubes, bottles, and other containers, and lids produced from the multilayer structure are useful for packaging general foods such as raw meat, processed meat (ham, bacon, sausage, and the like), and cooked rice and other cooked foods, semisolid foods and condiments such as mayonnaise, ketchup, sauce, miso, wasabi, mustard, barbecue sauce, jerry, pudding, and yogurt, fermented foods, fat/oil such as salad oil, soup, mirin, liquid beverages such as sake, beer, wine, juice, tea, sports drink, mineral water, and milk, pet food, cosmetics, pharmaceutical products, detergents, perfumes, industrial chemicals, agricultural chemicals, fuels, and the like in various application fields.

EXAMPLES

The present disclosure will hereinafter be described specifically by way of examples. It should be understood that the disclosure be not limited to these exampled within the scope of the disclosure.

In the examples, the term "parts" means "parts by weight" unless otherwise specified.

[Example 1]
<Preparation of Adhesive Layer Resin Composition>

Pellets of a maleic anhydride-modified linear low-density polyethylene (PLEXAR PX3236 available from Lyondell-Basell Inc. and having an absorbance ratio (a/b) of 0.05, a density of 0.922 g/cm$^3$, and an MFR of 2.0 g/10 minutes (as measured at 190° C. with a load of 2160 g)) was used as the polyolefin resin (A), and zinc laurate, zinc stearate, and zinc behenate were used as the fatty acid zinc salt (B) in equal proportions in a total proportion of 100 ppm on a metal basis based on the amount of an adhesive layer resin composition. More specifically, zinc laurate (having a molar mass of 464 g/mol) was used in a proportion of 33.3 ppm, zinc stearate (having a molar mass of 632 g/mol) was used in a proportion of 33.3 ppm, and zinc behenate (having a molar mass of 745 g/mol) was used in a proportion of 33.3 ppm on a metal basis based on the amount of the adhesive layer resin composition.

The pellets of the polyolefin resin (A), zinc laurate, zinc stearate and zinc behenate were dry-blended together, and the resulting blend was melt-kneaded by means of a 20-mm diameter twin-screw extruder (L/D=25) and pelletized.

In this example, most of the adhesive layer resin composition was the polyolefin resin (A), so that the absorbance ratio (a/b) of the polyolefin resin (A) was regarded as the absorbance ratio (a/b) of the adhesive layer resin composition. Therefore, the absorbance ratio (a/b) of the polyolefin resin (A) was calculated based on measurement performed under the following conditions, and defined as the absorbance ratio (a/b) of the adhesive layer resin composition.

A pellet of the polyolefin resin (A) was dried with heating at 100° C. for three hours, and sliced into a 90-μm thick test piece by means of a microtome. The resulting test piece was analyzed by a transmissive method by means of a Fourier transform infrared spectrophotometer (FT-IR), whereby the absorbance (a) at the peak attributable to C=O stretching vibration observed at around 1710 cm$^{-1}$ and the absorbance (b) at the peak attributable to C—H bending vibration observed at around 1450 cm$^{-1}$ were determined. Based on the values thus determined, the absorbance ratio (a/b) was calculated.

<Production of Multilayer Structure>

The adhesive layer resin composition prepared in the aforementioned manner, a linear low-density polyethylene (LLDPE) (UF240 available from Japan Polyethylene Corporation, and having a density of 0.920 g/cm$^3$ and an MFR of 2.1 g/10 minutes (as measured at 190° C. with a load of 2160 g)) as the thermoplastic resin, and an EVOH (having an ethylene content of 38 mol %, a saponification degree of 99.7 mol %, a density of 1.17 g/cm$^3$, and an MFR of 4.1 g/10 minutes (as measured at 210° C. with a load of 2160 g)) as the gas barrier resin were fed into a 3-type 5-layer multilayer coextrusion cast film forming apparatus, whereby a 3-type 5-layer multilayer structure (film) of thermoplastic resin layer/adhesive resin layer/gas barrier resin layer/adhesive resin layer/thermoplastic resin layer was produced under the following conditions by a multilayer coextrusion method.

The thicknesses (μm) of the respective layers of the multilayer structure were 37.5/5/15/5/37.5, and the overall thickness of the multilayer structure was 100 μm. The temperature of a die of the forming apparatus was set at 210° C.

[Conditions for Multilayer Coextrusion]

Intermediate layer extruder (for EVOH): a 40-mm diameter single screw extruder (having a barrel temperature of 210° C.)

Upper and lower layer extruders (for LLDPE): 40-mm diameter single screw extruders (each having a barrel temperature of 210° C.)

Middle upper and lower layer extruders (for adhesive layer resin composition): 32-mm diameter single screw extruders (each having a barrel temperature of 210° C.)

Die: a 3-type 5-layer feed block die (having a die temperature of 210° C.)

Take-up speed: 14 m/minute

Roll temperature: 50° C.

<Transparency>

The multilayer structure produced in the aforementioned manner was evaluated by an image clarity measurement method in conformity with JIS K7374 "Plastics—Determination of Image Clarity" (using an optical comb having a width of 0.25 mm). The measurement was performed with the film machine direction of a film test piece oriented vertically. An image clarity meter ICM-1 available from Suga Test Instruments Co., Ltd. was used for the measurement.

A higher image clarity value means excellent transparency. The result is shown in Table 1.

<Peeling Strength>

The multilayer structure produced in the aforementioned manner was evaluated for the peeling strength between the adhesive resin layer and the gas barrier resin layer by performing a T-peel test under the following conditions. The result is shown in Table 1.

[Conditions for T-Peel Test]

Apparatus: Autograph AGS-H (available from Shimadzu Corporation)

Load Cell: 500N

Test method: T-peel method (A test strip was held in a T-shape for peeling thereof)

Size of test strip: 15-mm width

Test speed: 300 mm/minute

[Example 2]

An inventive adhesive layer resin composition and an inventive multilayer structure were produced in substantially the same manner as in Example 1, except that zinc laurate, zinc stearate, and zinc behenate were used as the fatty acid zinc salt (B) in equal proportions in a total proportion of 50 ppm on a metal basis based on the amount of the adhesive layer resin composition. More specifically, zinc laurate was used in a proportion of 16.6 ppm, zinc stearate was used in a proportion of 16.6 ppm, and zinc behenate was used in a proportion of 16.6 ppm on a metal basis based on the amount of the adhesive layer resin composition.

The multilayer structure thus produced was evaluated in the same manner as in Example 1.

[Example 3]

An inventive adhesive layer resin composition and an inventive multilayer structure were produced in substantially the same manner as in Example 1, except that zinc laurate was used as the fatty acid zinc salt (B) in a proportion of 100 ppm on a metal basis based on the amount of the adhesive layer resin composition.

The multilayer structure thus produced was evaluated in the same manner as in Example 1.

[Example 4]

An inventive adhesive layer resin composition and an inventive multilayer structure were produced in substantially the same manner as in Example 1, except that zinc stearate was used as the fatty acid zinc salt (B) in a proportion of 100 ppm on a metal basis based on the amount of the adhesive layer resin composition.

The multilayer structure thus produced was evaluated in the same manner as in Example 1.

[Example 5]

An inventive adhesive layer resin composition and an inventive multilayer structure were produced in substantially the same manner as in Example 1, except that zinc behenate was used as the fatty acid zinc salt (B) in a proportion of 100 ppm on a metal basis based on the amount of the adhesive layer resin composition.

The multilayer structure thus produced was evaluated in the same manner as in Example 1.

[Example 6]

An inventive adhesive layer resin composition and an inventive multilayer structure were produced in substantially the same manner as in Example 1, except that pellets of a maleic anhydride-modified linear low-density polyethylene (MODIC M533 available from Mitsubishi Chemical Corporation and having an absorbance ratio (a/b) of 0.09, a density of 0.92 g/cm$^3$, and an MFR of 2.5 g/10 minutes (as measured at 190° C. with a load of 2160 g)) were used as the polyolefin resin (A).

The multilayer structure thus produced was evaluated in the same manner as in Example 1.

[Comparative Example 1]

An adhesive layer resin composition and amultilayer structure were produced in substantially the same manner as in Example 1, except that a fatty acid calcium salt was used instead of the fatty acid zinc salt (B). That is, calcium laurate, calcium stearate, and calcium behenate were used in equal proportions in a total proportion of 100 ppm on a metal basis based on the amount of the adhesive layer resin composition. More specifically, calcium laurate was used in a proportion of 33.3 ppm, calcium stearate was used in a proportion of 33.3 ppm, and calcium behenate was used in a proportion of 33.3 ppm on a metal basis based on the amount of the adhesive layer resin composition.

The multilayer structure thus produced was evaluated in the same manner as in Example 1.

[Comparative Example 2]

An adhesive layer resin composition and a multilayer structure were produced in substantially the same manner as in Example 1, except that a fatty acid sodium salt was used instead of the fatty acid zinc salt (B). That is, sodium laurate, sodium stearate, and sodium behenate were used in equal proportions in a total proportion of 100 ppm on a metal basis based on the amount of the adhesive layer resin composition. More specifically, sodium laurate was used in a proportion of 33.3 ppm, sodium stearate was used in a proportion of 33.3 ppm, and sodium behenate was used in a proportion of 33.3 ppm on a metal basis based on the amount of the adhesive layer resin composition.

The multilayer structure thus produced was evaluated in the same manner as in Example 1.

[Comparative Example 3]

An adhesive layer resin composition and amultilayer structure were produced in substantially the same manner as in Example 1, except that zinc laurate, zinc stearate, and zinc behenate were used as the fatty acid zinc salt (B) in equal proportions in a total proportion of 300 ppm on a metal basis based on the amount of the adhesive layer resin composition. More specifically, zinc laurate was used in a proportion of 100 ppm, zinc stearate was used in a proportion of 100 ppm, and zinc behenate was used in a proportion of 100 ppm on a metal basis based on the amount of the adhesive layer resin composition.

The multilayer structure thus produced was evaluated in the same manner as in Example 1.

[Comparative Example 4]

An adhesive layer resin composition and a multilayer structure were produced in substantially the same manner as in Example 1, except that zinc stearate was used as the fatty acid zinc salt (B) in a proportion of 20 ppm on a metal basis based on the amount of the adhesive layer resin composition.

The multilayer structure thus produced was evaluated in the same manner as in Example 1.

[Reference Example 1]

An adhesive layer resin composition and a multilayer structure were produced in substantially the same manner as in Example 1, except that the fatty acid zinc salt (B) was not blended.

The multilayer structure thus produced was evaluated in the same manner as in Example 1.

The evaluation results are collectively shown below in Table 1.

TABLE 1

| | Proportion (ppm) of fatty acid metal salt (B)* | Fatty acid metal salt (B) | Evaluation Transparency (%) | Peeling strength N/15 (mm) |
|---|---|---|---|---|
| Example 1 | 100 | Zinc laurate Zinc stearate Zinc behenate | 12.24 | 6.18 |
| Example 2 | 50 | Zinc laurate Zinc stearate Zinc behenate | 8.63 | 6.49 |
| Example 3 | 100 | Zinc laurate | 18.26 | 6.53 |
| Example 4 | 100 | Zinc stearate | 17.35 | 6.26 |
| Example 5 | 100 | Zinc behenate | 17.25 | 6.4 |
| Example 6 | 100 | Zinc laurate Zinc stearate Zinc behenate | 12.12 | 7.29 |
| Comparative Example 1 | 100 | Calcium laurate Calcium stearate Calcium behenate | 5.42 | 1.76 |
| Comparative Example 2 | 100 | Sodium laurate Sodium stearate Sodium behenate | 12.8 | 1.41 |
| Comparative Example 3 | 300 | Zinc laurate Zinc stearate Zinc behenate | 38.82 | 1 |

TABLE 1-continued

| | Proportion | | Evaluation | |
|---|---|---|---|---|
| | (ppm) of fatty acid metal salt (B)* | Fatty acid metal salt (B) | Transparency (%) | Peeling strength N/15 (mm) |
| Comparative Example 4 | 20 | Zinc stearate | 4.21 | 6.70 |
| Reference Example 1 | — | — | 3.27 | 6.75 |

*Proportion on metal basis based on amount of adhesive layer resin composition

In Reference Example 1, the multilayer structure including the adhesive resin layer formed by using only the adhesive resin was evaluated. In comparison between the results for Reference Example. 1 and the results for Comparative Example 1 in which the fatty acid calcium salt was used as an additive in a proportion of 100 ppm on a metal basis, the multilayer structure of Comparative Example 1 was significantly poorer in peeling strength, so that the adhesion was practically problematic. Further, the multilayer structure of Comparative Example 1 had substantially the same transparency level. The multilayer structure of Comparative Example 2, in which the fatty acid sodium salt was used, had transparency about four times higher than that of the multilayer structure of Reference Example 1, but was further poorer in peeling strength than the multilayer structure of Comparative Example 1 and, therefore, was impractical. On the other hand, the multilayer structure of Comparative Example 3, in which the fatty acid zinc salt (B) was blended in a proportion of 300 ppm on a metal basis, was highly transparent as compared with Reference Example 1, but was significantly poor in adhesion as in Comparative Examples 1 and 2.

In contrast, the inventive multilayer structure of Example 1, in which the fatty acid zinc salt (B) was blended in the specific proportion, had transparency about four times higher than that of the multilayer structure of Reference Example 1, and ensured the same level of adhesion. Thus, Example 1 provided unexpected effects.

Further, the multilayer structure of Example 2, in which the fatty acid zinc salt (B) was blended in a proportion of 50 ppm on a metal basis, had transparency more than two times higher than that of the multilayer structure of Reference Example 1, and ensured the same level of adhesion.

Further, the multilayer structures of Examples 3 to 5, in which different types of the fatty acid zinc salt (B) were respectively used for the inventive adhesive layer resin compositions, each had transparency five to six times higher than that of the multilayer structure of Reference Example 1, and ensured proper adhesion. Thus, Examples 3 to 5 provided excellent effects.

Where the multilayer structure of Comparative Example 1 was used as a packaging material, a content packaged with the packaging material was not clearly visible. Where the multilayer structures of Examples 1 to 5 were used as packaging materials, in contrast, contents packaged with the packaging materials were clearly visible.

As apparent from Examples described above, where the adhesive resin layer contains the polyolefin resin (A) and the fatty acid zinc salt (B), and the fatty acid zinc salt (B) is present in the adhesive resin layer in the specific greater proportion, the resulting multilayer structure has a higher level of transparency. Such an effect cannot be created with the use of the other fatty acid metal salts, but the remarkable effect of the present disclosure can be created only when the fatty acid zinc salt (B) is used in the specific proportion.

While specific forms of the embodiments of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The inventive multilayer structure is useful as a packaging material. Bags, cups, trays, tubes, bottles, and other containers, and lids produced from the multilayer structure are useful for packaging general foods such as raw meat, processed meat (ham, bacon, sausage, and the like), and cooked rice, and other cooked foods, semisolid foods and condiments such as mayonnaise, ketchup, sauce, miso, wasabi, mustard, barbecue sauce, jerry, pudding, and yogurt, fermented foods, fat/oil such as salad oil, soup, mirin, liquid beverages such as sake, beer, wine, juice, tea, sports drink, mineral water, and milk, pet food, cosmetics, pharmaceutical products, detergents, perfumes, industrial chemicals, agricultural chemicals, fuels, and the like in various application fields.

The invention claimed is:

1. A multilayer structure comprising:
a thermoplastic resin layer;
a gas barrier resin layer; and
an adhesive resin layer provided between the thermoplastic resin layer and the gas barrier resin layer;
wherein the adhesive resin layer comprises a resin composition comprising:
(A) a polyolefin resin containing at least one of a carboxyl group and an acid anhydride group; and
(B) one or more fatty acid zinc salts;
wherein the one or more fatty acid zinc salts (B) is present in the resin composition in a proportion of 80 to 250 ppm on a metal basis based on an amount of the adhesive resin layer;
wherein the resin composition for the adhesive resin layer is free from a hydrotalcite; and
wherein the resin composition for the adhesive resin layer has an absorbance ratio (a/b) of 0.005 to 0.5, wherein (a) is an absorbance at a peak attributable to C=O stretching vibration observed at around $1710$ $cm^{-1}$ and (b) is an absorbance at a peak attributable to C—H bending vibration observed at around $1450$ $cm^{-1}$ in Fourier transform infrared spectroscopy performed on the resin composition by a transmission method.

2. The multilayer structure according to claim 1, wherein the one or more fatty acid zinc salts (B) present in the resin composition for the adhesive resin layer has a carbon number of 4 to 28.

3. The multilayer structure according to claim 1, wherein the one or more fatty acid zinc salts (B) present in the resin composition for the adhesive resin layer has a molar mass of 200 to 1000 g/mol.

4. The multilayer structure according to claim 1, wherein a gas barrier resin as a material for the gas barrier resin layer comprises at least one of a saponified ethylene-vinyl ester copolymer and a polyamide resin.

5. The multilayer structure according to claim 1, which has an overall thickness of 10 to 5000 μm.

6. The multilayer structure according to claim 1, wherein a thickness ratio between the gas barrier resin layer and the adhesive resin layer is (gas barrier resin layer/adhesive resin layer)=10/90 to 99/1.

7. The multilayer structure according to claim 1, wherein the one or more fatty acid zinc salts (B) is present in the resin composition in a proportion of 80 to 100 ppm on a metal basis based on an amount of the adhesive resin layer.

8. A resin composition for an adhesive resin layer, the resin composition comprising:
(A) a polyolefin resin containing at least one of a carboxyl group and an acid anhydride group; and
(B) one or more fatty acid zinc salts;
wherein the one or more fatty acid zinc salts (B) is present in a proportion of 80 to 250 ppm on a metal basis based on an amount of the resin composition;
wherein the resin composition for the adhesive resin layer is free from a hydrotalcite; and
wherein the resin composition for the adhesive resin layer has an absorbance ratio (a/b) of 0.005 to 0.5, wherein (a) is an absorbance at a peak attributable to C=O stretching vibration observed at around 1710 $cm^{-1}$ and (b) is an absorbance at a peak attributable to C—H bending vibration observed at around 1450 $cm^{-1}$ in Fourier transform infrared spectroscopy performed on the resin composition by a transmission method.

9. The multilayer structure according to claim 1, wherein a proportion of the polyolefin resin (A) is not less than 70 wt. % in the resin composition for the adhesive resin layer.

10. The resin composition for an adhesive resin layer according to claim 8, wherein the one or more fatty acid zinc salts (B) is present in the resin composition in a proportion of 80 to 100 ppm on a metal basis based on an amount of the resin composition.

11. A method of producing the multilayer structure according to claim 1, comprising:
preparing a thermoplastic resin for the thermoplastic resin layer;
preparing a gas barrier resin for the gas barrier resin layer;
preparing a resin composition for the adhesive resin layer, the resin composition comprising a polyolefin resin (A) containing at least one of a carboxyl group and an acid anhydride group, and 80 to 250 ppm of one or more fatty acid zinc salts (B) on a metal basis based on an amount of the resin composition; and
forming the thermoplastic resin layer, the adhesive resin layer, and the gas barrier resin layer from the thermoplastic resin, the resin composition, and the gas barrier resin, respectively, by a coextrusion method or a coinjection molding method.

12. The method of producing the multilayer structure according to claim 11, wherein, in the preparation of the resin composition, the one or more fatty acid zinc salts (B) is present in the resin composition in a proportion of 80 to 100 ppm on a metal basis based on an amount of the resin composition.

* * * * *